US012619787B2

(12) United States Patent
Silva et al.

(10) Patent No.: US 12,619,787 B2
(45) Date of Patent: May 5, 2026

(54) SYSTEMS AND METHODS FOR VERIFYING DIGITAL DOCUMENTS

(71) Applicant: Avast Software s.r.o., Prague (CZ)

(72) Inventors: David Luz Silva, Dublin (IE); Kevin Roundy, El Segundo, CA (US); Paul Dunphy, Cambridge (GB)

(73) Assignee: Gen Digital Inc., Tempe, AZ (US)

( * ) Notice: Subject to any disclaimer, the term of this patent is extended or adjusted under 35 U.S.C. 154(b) by 143 days.

(21) Appl. No.: 18/356,439

(22) Filed: Jul. 21, 2023

(65) Prior Publication Data

US 2025/0028863 A1      Jan. 23, 2025

(51) Int. Cl.
| | |
|---|---|
| *G06F 21/64* | (2013.01) |
| *H04L 9/00* | (2022.01) |
| *H04L 9/32* | (2006.01) |

(52) U.S. Cl.
CPC ................ *G06F 21/64* (2013.01); *H04L 9/50* (2022.05)

(58) Field of Classification Search
CPC .......... G06F 21/64; H04L 9/50; H04L 9/3239
See application file for complete search history.

(56) References Cited

U.S. PATENT DOCUMENTS

| | | | | |
|---|---|---|---|---|
| 7,509,477 | B2 * | 3/2009 | Suponau | G06F 16/325 711/216 |
| 11,184,406 | B1 * | 11/2021 | Shashank | H04L 67/1095 |

| | | | | |
|---|---|---|---|---|
| 2013/0179985 | A1 * | 7/2013 | Strassmann | H04L 63/0428 726/26 |
| 2016/0378999 | A1 * | 12/2016 | Panchapakesan | G06F 21/6254 726/26 |
| 2019/0052467 | A1 * | 2/2019 | Bettger | H04L 9/0643 |
| 2019/0356493 | A1 * | 11/2019 | Fisher | H04L 63/102 |
| 2021/0334257 | A1 * | 10/2021 | Bensberg | G06F 16/94 |
| 2022/0123935 | A1 * | 4/2022 | Baessler | G06F 16/93 |
| 2023/0195933 | A1 * | 6/2023 | Satish Padmanabhan | G06F 40/263 726/26 |
| 2023/0283478 | A1 * | 9/2023 | Osborn | H04L 9/3242 713/172 |
| 2023/0385431 | A1 * | 11/2023 | Barros | H04L 63/10 |
| 2023/0419308 | A1 * | 12/2023 | Madisetti | G06Q 20/38 |
| 2024/0264996 | A1 * | 8/2024 | Soon-Shiong | G06F 16/2255 |
| 2025/0024253 | A1 * | 1/2025 | Wu | H04W 12/06 |

OTHER PUBLICATIONS iDatafy LLC, archived webpage at: https://web.archive.org/web/20230603203546/https://www.smartresume.com/, captured Jun. 3, 2023, accessed Jan. 6, 2026.

iDatafy LLC, archived webpage at: https://web.archive.org/web/20230603221714/https://www.smartresume.com/product, captured Jun. 3, 2023, accessed Jan. 6, 2026.

(Continued)

*Primary Examiner* — Andrew Suh
(74) *Attorney, Agent, or Firm* — Dovas Law, P.C.

(57) ABSTRACT

A system and method are provided by which an electronic address associated with a user is monitored. Based on the monitoring, an electronic message is detected including a digital document. A cryptographic function is applied to the digital document to generate a hash which is rendered (Continued)

accessible at a network location. An identification of the network location of the hash is transmitted to a first computing system associated with the user.

14 Claims, 6 Drawing Sheets

(56)                    References Cited

OTHER PUBLICATIONS iDatafy LLC, archived webpage at: https://web.archive.org/web/20230603220311/https://www.smartresume.com/resources/smartreport-ecosystem-map, captured Jun. 3, 2023, accessed Jan. 6, 2026.
iDatafy LLC, archived webpage at: https://web.archive.org/web/20230603210931/https://www.smartresume.com/resources/faq, captured Jun. 3, 2023, accessed Jan. 6, 2026.
iDatafy LLC, archived webpage at: https://web.archive.org/web/20230603212935/https://www.smartresume.com/who-we-serve/jobseekers, captured Jun. 3, 2023, accessed Jan. 6, 2026.
iDatafy LLC, archived webpage at: https://web.archive.org/web/20230603220125/https://www.smartresume.com/who-we-serve/employers, captured Jun. 3, 2023, accessed Jan. 6, 2026.
iDatafy LLC, archived webpage at: https://web.archive.org/web/20230603215127/https://www.smartresume.com/who-we-serve/institutions, captured Jun. 3, 2023, accessed Jan. 6, 2026.
iDatafy LLC, archived webpage at: https://web.archive.org/web/20230603202925/https://www.smartresume.com/about/smartresume, captured Jun. 3, 2023, accessed Jan. 12, 2026.
Evernym, Inc., archived webpage at: https://web.archive.org/web/20230531113026/https://www.evernym.com/blog/eu-digital-identity/, captured May 31, 2023, accessed Jan. 13, 2026.
The PIE Ltd, archived webpage at: https://web.archive.org/web/20230402090450/https://thepienews.com/news/digitary-evernym-collaborate-boost-credentialing/, captured Apr. 2, 2023, accessed Jan. 13, 2026.
Phillip J. Windley, How Sovrin Works, Oct. 3, 2016, Sovrin.org.
Alex Preukschat; Drummond Reed, Self-Sovereign Identity: Decentralized digital identity and verifiable credentials, Manning, 2021.
Daniel Hardman, How DIDs, Keys, Credentials, and Agents Work in Sovrin, Apr. 2018, Sovrin. org.
Dmitry Khovratovich; Jason Law, Sovrin: Digital Identities in the Blockchain Era, Dec. 2016, Sovrin. org.
Mary Lacity and Erran Carmel, Implementing Self-Sovereign Identity (SSI) for a digital staff passport at UK National Health Service (NHS), BCoE Whitepaper, Jan. 2022.

* cited by examiner

300

MONITOR AN ELECTRONIC ADDRESS
ASSOCIATED WITH A USER — 302

DETECT AN ELECTRONIC MESSAGE
INCLUDING A DIGITAL DOCUMENT BASED ON
THE MONITORING — 304

APPLY A CRYPTOGRAPHIC FUNCTION TO
THE DIGITAL DOCUMENT TO GENERATE A
HASH — 306

RENDER THE HASH ACCESSIBLE AT A
NETWORK LOCATION — 308

TRANSMIT TO A COMPUTING SYSTEM AN
IDENTIFICATION OF THE NETWORK
LOCATION OF THE HASH — 310

SYSTEMS AND METHODS FOR VERIFYING DIGITAL DOCUMENTS

TECHNICAL FIELD

The disclosure relates generally to verifying digital documents.

BACKGROUND

Digital documents are frequently provided to verify the qualifications of people. Digital documents can be provided for example as a proof of achievement of a university degree, of an academic course accomplishment, or of professional experience. In an electronic transaction involving a digital document, actors typically include an issuer, an earner, and a target entity. An "issuer" is an entity that generates a digital document, for example a university, an online course or certification platform, or a human resources ("HR") department of a business entity. An "earner" is a person or other entity who has earned and is entitled to obtain a digital document as a proof of an achievement or a qualification of theirs, for example a university graduate entitled to obtain their university transcript. A "target entity" is an entity that seeks to obtain and verify a digital document as a proof of a qualification, achievement, or other criteria that relates to an earner, for example a prospective employer, prospective financer, or prospective landlord of the earner.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided including monitoring by one or more processors a first electronic address associated with a user. The method further includes detecting, based on the monitoring, an electronic message including a first digital document. A cryptographic function is applied to the first digital document to generate a first hash. The first hash is rendered accessible at a network location, and an identification of the network location of the first hash is transmitted to a first computing system associated with the user.

Another method is provided including monitoring by one or more processors online activity of a user, the user performing the online activity via a first computing system. The method further includes detecting, based on the monitoring by the one or more processors of the online activity, a first digital document downloaded by the user from a second computing system. A cryptographic function is applied to the first digital document to generate a first hash. The first hash is rendered accessible at a network location, and an identification of the network location of the first hash is transmitted to the first computing system.

A system is provided including one or more processors and memory storing executable instructions that, as a result of being executed, cause the system to perform operations. The operations include monitoring by one or more processors a first electronic address associated with a user. The operations further include detecting, based on the monitoring, an electronic message including a first digital document. A cryptographic function is applied to the first digital document to generate a first hash. The first hash is rendered accessible at a network location, and an identification of the network location of the first hash is transmitted to a first computing system associated with the user.

Another system is provided including one or more processors and memory storing executable instructions that, as a result of being executed, cause the system to perform operations. The operations include monitoring by one or more processors online activity of a user, the user performing the online activity via a first computing system. The operations further include detecting, based on the monitoring by the one or more processors of the online activity, a first digital document downloaded by the user from a second computing system. A cryptographic function is applied to the first digital document to generate a first hash. The first hash is rendered accessible at a network location, and an identification of the network location of the first hash is transmitted to the first computing system.

A non-transitory computer-readable storage medium storing executable instructions that, as a result of execution by one or more processors of a computer system, cause the computer system to perform operations. The operations include monitoring by one or more processors online activity of a user, the user performing the online activity via a first computing system. The operations further include detecting, based on the monitoring by the one or more processors of the online activity, a first digital document downloaded by the user from a second computing system. A cryptographic function is applied to the first digital document to generate a first hash. The first hash is rendered accessible at a network location, and an identification of the network location of the first hash is transmitted to the first computing system.

BRIEF DESCRIPTION OF THE DRAWINGS

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENTS

Figure 1:
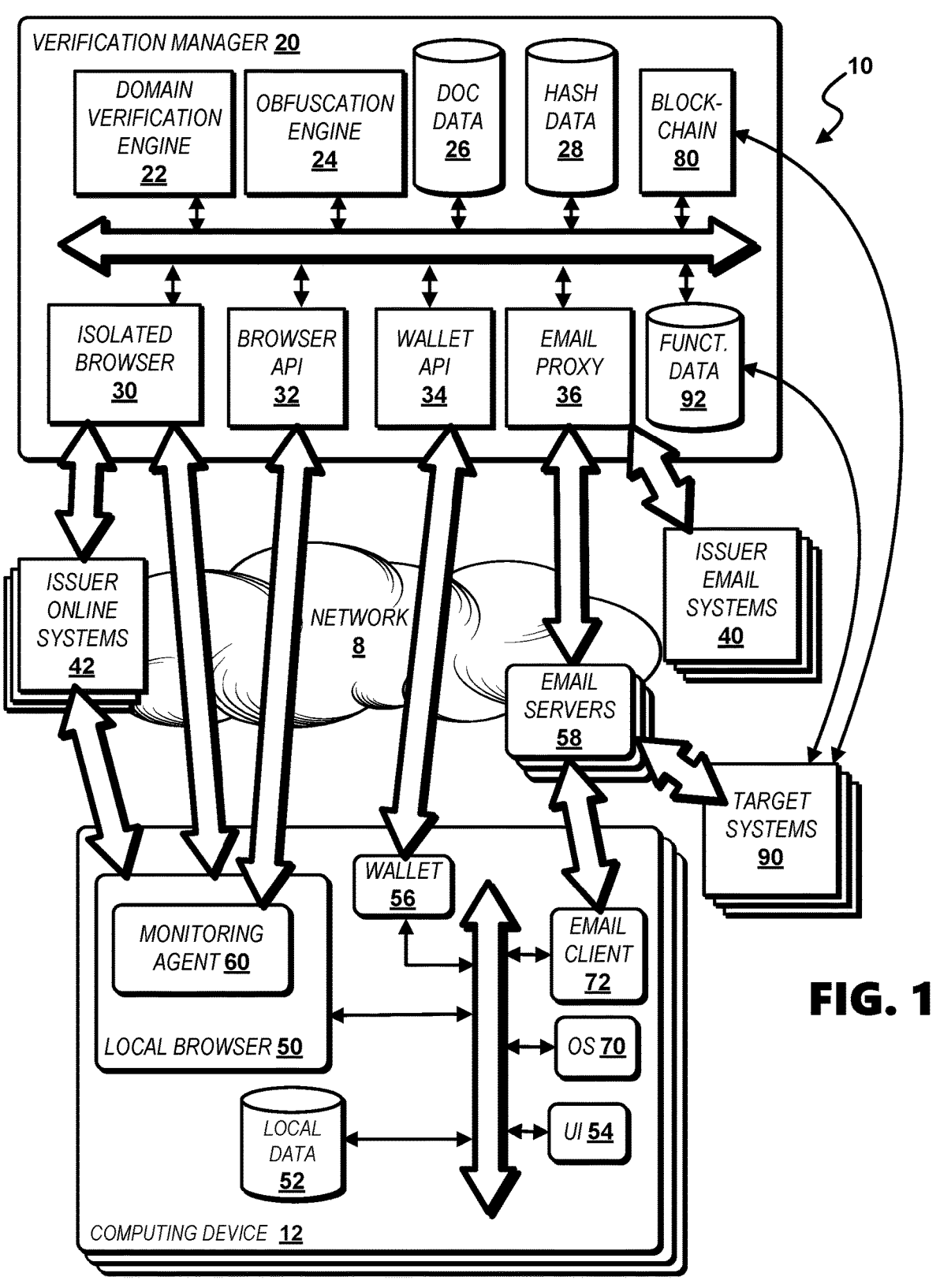
FIG. 1 shows an environment enabled by a computer network in which a network-connectable processor-enabled verification manager automates processes of verifying the authenticity of digital documents and obfuscating sensitive parts of digital documents.

As described herein, reference to "first," "second," "third," "particular," "additional," or "other" components or implementations (e.g., "a first computing system," "a first hash," a "particular user," a "particular computing device", or a "particular implementation") is not used to show a serial or numerical limitation or a limitation of quality but instead is used to distinguish or identify the various components and implementations.

Terms set forth herein are described as follows:

An "issuer" is an entity that generates a digital document, for example a university, an online course or certification platform, or a human resources ("HR") department of a business entity.

An "earner" is a person or other entity who has earned and is entitled to obtain a digital document as a proof of an achievement or a qualification of theirs, for example a university graduate entitled to obtain their university transcript.

A "target entity" is an entity that seeks to obtain and verify a digital document as a proof of a qualification, achievement, or other criteria that relates to an earner or other entity providing the digital document. A "target entity" may include for example a prospective employer, prospective financer, or prospective landlord of the earner.

The process of transfer of digital documents typically involves a swap of emails between actors in order to request and receive a digital document or a visit by an earner to an online platform enabled by an issuer that issues the digital document via direct download to the earner via a computing device of the earner. The target entity that ultimately receives a digital document associated with an earner is typically not involved in the process of how the digital document is transmitted to the target entity. This opens space for tampering, falsification, and forgery of a digital document prior to receipt by a target entity.

When a document is obtained in digital format there are limitations when it comes to guaranteeing the document's authenticity regarding its issuing source origin. Existing solutions are focused on relating the document to a person rather than verifying the integrity of document itself. The usage of digital credentials allows platforms to vouch for a document based on a perceived integrity of a holder of a digital document (e.g., a particular holder has good security hygiene in his/her devices), but not to vouch for the integrity of third-party digital documents. As a result, digital document containers (e.g., digital wallets) are limited in terms of functionality, and users can generally only keep authenticated documents provided by governmental entities and specialized registries that host pre-configured verification mechanisms.

Herein described systems and methods enable verifying an issuing source of a digital document and directing a process of how a digital document is requested, received, and shared between parties. Particularly, herein described systems and methods ensure the authenticity and integrity of a digital document shared between two entities by monitoring the process from which the document is obtained at its issuing source and subsequently generating metadata that allows the document's details to be transparently and independently validated by future recipients.

Herein described systems and methods further address the problem that digital documents shared by an entity (e.g., an "earner") may include confidential information, and the entity sharing the digital documents may not trust the entity to whom the digital documents are being sent. For example, an earner may be a prospective renter of a home who sends digital documents to verify the prospective renter's income to a target entity who is a prospective landlord that the prospective renter has never met. In such case, the earner (e.g., a renter) may benefit from obscuring particular sensitive fields (e.g., government identification numbers or birthdates on a tax reporting form) in the digital documents they send to a target entity (e.g., a landlord). Obscuring sensitive parts of a digital document by an earner may be considered tampering with the digital document potentially reducing a level of trust on the part of the recipient of the digital document, the target entity.

Referring to FIG. 1, an environment 10 enabled by a computer network 8 is illustrated in which a network-connectable processor-enabled verification manager 20 operates. The verification manager 20 enables verifying source and authenticity of digital documents. The verification manager 20 further enables identifying sensitive parts of a digital document and obfuscating the sensitive parts according to unique requirements of one or more target entities who are the intended recipients of the digital document.

The verification manager 20 operates in communication with computing devices 12 operating in the computer network 8. The computing devices include an operating system 70 for executing applications and a user interface 54 enabling display of data and interaction with a user. The computer network 8 includes one or more wired or wireless networks or a combination thereof, for example a local area network (LAN), a wide area network (WAN), the internet, mobile telephone networks, and wireless data networks such as Wi-Fi™ and 3G/4G/5G cellular networks. A module in the form of a monitoring agent 60 (e.g., a desktop app, browser extension, browser plugin, browser addon, browser integration, or a browser embedded software module), enables monitoring of network browsing activities performed by a user using a web browser application ("local browser") 50 on a computing device 12 and collecting data based on the monitoring. The monitoring agent 60 by its monitoring is enabled to detect digital documents downloaded on a computing device 12, which digital documents are stored in a local datastore 52. The monitoring agent 60 provides the verification manager 20 with intelligence data including digital documents retrieved by a user via the computing device 12 at one or more websites, or other network destinations, which data is beneficially received from the monitoring agent 60 by the verification manager 20 via the browser application program interface ("browser API") 32 and stored in identified or de-identified form in a document datastore 26.

The verification manager 20 enables mechanisms that automate processes of verifying digital document authenticity and obfuscate sensitive parts of a digital document. The verification manager 20 enables digital document verification via email relay by leveraging email protocols and application program interfaces ("APIs") to automate, monitor and validate the process of requesting and issuing a digital document. The verification manager 20 also enables digital document verification via download interception by the monitoring agent 60 which leverages a client-side presence to monitor the digital document download process, check the domain from which the digital document is downloaded and perform hash checksums of the digital document. The verification manager 20 further enables digital document verification via download interception by an isolated browser 30 accessible by a user through the user's local browser 50. The verification manager 20 and the monitoring agent 60 are each enabled to detect sensitive data in digital documents. The verification manager 20 and the monitoring agent 60 are each further enabled to split, map, and obfuscate (e.g., blur) sensitive data in a digital document.

The verification manager 20 enables a user to register for an email mask service by establishing an email account hosted by the email proxy 36 (hereinafter "proxy account"). The verification manager 20 generates an email mask which is enabled by an email proxy 36 to communicate with an issuer (e.g., an institution). The email proxy 36 facilitates communication with issuers that require user engagement via email. The email proxy 36 is configured to monitor and forward mail to and from one or more email servers 58, for example one or more of a Simple Mail Transfer Protocol ("SMTP") server, a POP3 server, or an IMAP server, which one or more email servers 58 relay emails from and to an email client 72 on a computing device 12 accessible by a user. The email proxy 36 monitors via the proxy account messages sent and received between a user of a computing device 12 and an issuer email system 40 which transmits and receives digital documents on behalf of an issuer (e.g., an institution). Whenever email communication or other electronic communication to or from a user of the computing device 12 yields a digital document, the email proxy 36 makes a copy of the digital document which is stored in the document datastore 26. The email proxy 36 performs a file checksum on the digital document by applying a cryptographic function to generate a cryptographic hash, which cryptographic hash is stored in a hash datastore 28 for future verification checks confirming the integrity of the digital document. The cryptographic hash is further added to a network-accessible blockchain 80 to permit a recipient of the digital document (i.e., a target entity) to verify the integrity of the digital document. Alternatively, the digital document is added directly to the blockchain 80 in its original form. Alternatively, the cryptographic hash is rendered accessible to a recipient of the digital document via the hash datastore 28.

In addition to monitoring emails via the email proxy 36, the verification manager 20 verifies the email addresses contacted by a user by email via the email proxy 36 and from which a user is contacted by email via the email proxy 36. The verification manager 20 via the domain verification engine 22 performs domain-based checks and mappings to verify the ownership of domains of email addresses, for example achieved using Transport Layer Security ("TLS") certification pools, and the domain verification engine 22 performs email header checks to detect spoofing attempts. In this manner, a source of a digital document is verified.

After the verification manager 20 verifies a source of a digital document, the verification manager 20 adds the digital document or a hash of the digital document to the blockchain 80 and forwards the digital document to the requester via email via an email server 58. Alternatively, the digital document or a hash of the digital document is added to the blockchain 80 and the digital document is made available by a wallet API 34 to the requester in a digital wallet 56 accessible on the computing device 12. The requester, for example an earner of a qualification described by the digital document, can transmit via the computing device 12 the digital document to a target entity (e.g., a prospective landlord or employer). The target entity, via a computing system described herein as a target system 90, is enabled to verify the digital document by accessing hash data or the original document on the blockchain 80. Alternatively, the target entity via the target system 90 is enabled to verify the digital document by accessing hash data in the hash datastore 28. The target entity via the target system 90 is enabled to apply a cryptographic function (e.g., a cryptographic checksum utility) to the digital document to generate a cryptographic hash of the digital document and to compare the generated cryptographic hash to the hash of the digital document stored by the verification manager 20 on the blockchain 80 or in the hash datastore 28 to verify the digital document. The cryptographic function is rendered accessible to the target system 90 via a network-accessible function datastore 92.

Issuers may allow digital documents to be directly requested for download via platforms enabled by online systems (hereinafter "issuer online systems 42"). A client-side presence in the form of a monitoring agent 60 on a computing device 12 of a user (e.g., an earner) monitors and collects downloaded documents or certificates from domains where the downloads were initiated. The monitoring agent 60 performs a file checksum on a downloaded digital document by applying a cryptographic function to generate a cryptographic hash, and the monitoring agent 60 stores the hash in the hash datastore 28 and on the blockchain 80. The user of the computing device 12 (e.g., an earner) can transmit the downloaded digital document from the computing device 12 to another computing system, herein described as a target system 90 (e.g., operating on behalf of a target entity), to enable the target system 90 to verify the digital document's integrity via the stored cryptographic hash. The target system 90 is enabled to perform a file checksum on the digital document by applying the cryptographic function (e.g., by implementing a cryptographic checksum utility) to the downloaded digital document to generate a cryptographic hash of the digital document and to compare the generated cryptographic hash to the cryptographic hash of the digital document stored by the verification manager 20 on the blockchain 80 or in the hash datastore 28 to verify the digital document. The cryptographic function applied by the target system 90 is downloaded by the target system 90 from the network-accessible function datastore 92.

The monitoring agent 60, the email proxy 36, and the isolated browser 30 are configured to detect parts of text of a digital document, for example text that resembles numbers, field labels, or phrases. For documents received or stored as images, the monitoring agent 60, the email proxy 36, or the isolated browser 30, for example via an obfuscation engine 24, implements optical character recognition ("OCR") algorithms to determine parts of the text ("text part") that resemble numbers, field labels, or phrases. The monitoring agent 60, the email proxy 36, or the isolated browser 30 further generates an identifier, for example a universal unique identifier ("UUID"), from each text part and defines a pixel range box from the text part's location in the document. The monitoring agent 60, the email proxy 36, or the isolated browser 30 generates an image from the digital document and for each pixel range box applies one or more masks (e.g., leveraging Python™ masks using NumPy™ and openCV™ CV2™) to the image generated from the digital document to generate a masked document.

Upon a request for a digital document (e.g., a document stored in the local datastore 52) received by a user via the computing device 12 (e.g., a request from a solicitor, bank, or institution), the monitoring agent 60 is automatized to extract from text of the digital document the fields that are being requested and apply UUID boxes to obfuscate one or more parts of the digital document that are not part of the requester's requirements to generate a masked document. Masked documents are beneficially cryptographically signed and kept on a distributed ledger (e.g., the blockchain 80) for further integrity checks.

Figure 2:
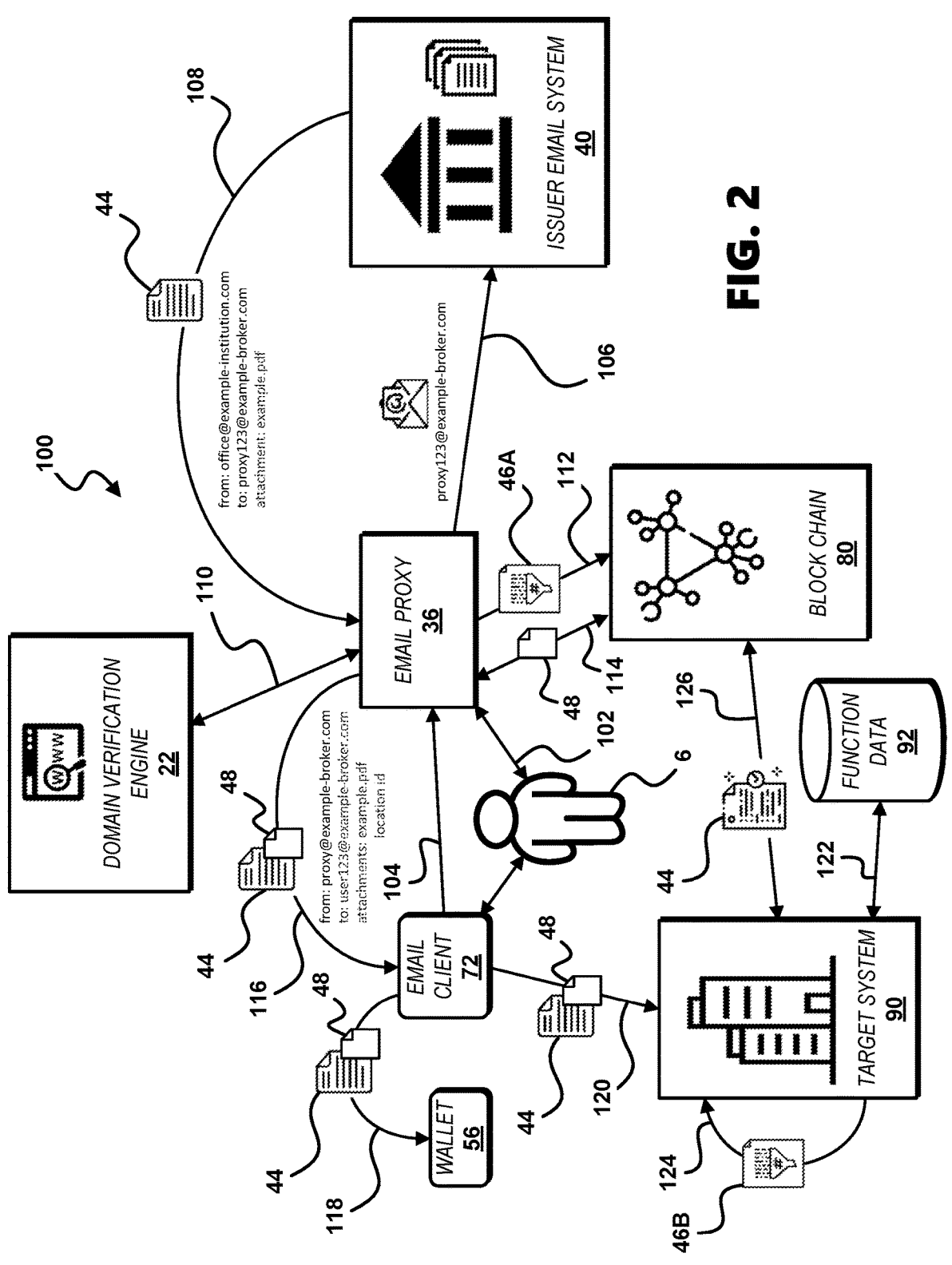
FIGS. 2 and 3 show process flows for enabling verification of a digital document.

Referring to FIG. 2, a first process flow 100 enabled by the components set forth in the environment 10 is shown. In a step 102, a user 6, for example via a computing device 12, transmits a request to an email proxy 36 for an electronic address to be used as a proxy email address (e.g., proxy123@example-broker.com) for communication by the user 6. The email proxy 36 associates the proxy email address to another email address in use by the user (e.g., user123@example-broker.com) to which emails are forwarded subject to conditions. The email proxy 36 includes an application program interface ("API") for receiving the request, or alternatively receives the request via another API (e.g., the browser API 32) enabled by the verification manager 20.

In a step 104, the user 6 through the email client 72 initiates an email transmission to an issuer email system 40 via the email proxy 36 using the proxy email address (e.g., proxy123@example-broker.com) to request a digital document (e.g., a diploma) from the issuer email system 40. The email proxy 36 forwards the request as an email from the proxy email address (e.g., proxy123@example-broker.com) to the issuer email system 40 (step 106). Alternatively, the user 6 can request the digital document from the issuer email system 40 via an online interface of the issuer email system 40 accessible via a local browser 50 or other application. The email proxy 36 receives from the issuer email system 40 an electronic message including a digital document 44 (e.g., example.pdf) from an email address (e.g., office@example-institution.com) of the issuer email system 40 to the proxy email address (e.g., proxy123@example-broker.com) of the user (step 108). The email proxy 36 detects the digital document 44 and verifies via the domain verification engine 22 an ownership of the domain (e.g., example-institution.com) of the email address of the issuer email system 40 (step 110). In response to verifying the ownership of the domain, the email proxy 36 applies a cryptographic function to the digital document 44 to generate a first hash 46A which is added to the blockchain 80 (step 112). The email proxy 36 generates a location indicator 48 including an address for locating the blockchain 80 on the network 8 and for locating the first hash 46A on the blockchain 80 (step 114). The location indicator 48 further includes a network link to access the cryptographic function used to generate the first hash 46A.

Further in response to verifying the ownership of the domain, the email proxy 36 forwards the electronic message including the digital document 44 together with the location indicator 48 to the user 6 who receives it on their computing device 12 via the email client 72 (step 116). The user 6 is enabled to add the digital document 44 and the location indicator 48 to their digital wallet 56 (step 118). Alternatively, the digital document 44 and the location indicator 48 are automatically added to the digital wallet 56 via the wallet API 34 of the verification manager 20.

In a subsequent transaction, the user 6 transmits the digital document 44 and the location indicator 48 via the email client 72 to a target system 90 associated with a target entity that requested the digital document 44 from the user (step 120). Alternatively, the transmission of the digital document 44 and the location indicator 48 are performed by the digital wallet 56 in communication with a digital wallet or other credential repository rendered accessible by the target system 90.

The target system 90 accesses the cryptographic function at the network-accessible function datastore 92 via the network link included in the location indicator 48 (step 122). The target system 90 applies the cryptographic function to the digital document 44 to generate a second hash 46B (step 124). The target system 90 accesses the first hash 46A on the blockchain 80 based on the location indicator 48 including the address for locating the first hash 46A, and the target system 90 compares the second hash 46B to the first hash

46A to verify the digital document 44 (step 126). Alternatively, the blockchain 80 is configured with a verification engine which receives the digital document 44 and location indicator 48 from the target system 90 and applies the cryptographic function to the digital document 44 to generate another hash which is compared to the first hash 46A to verify the digital document 44. Alternatively, the blockchain 80 is configured with a verification engine which receives the second hash 46B and location indicator 48 from the target system 90 and compares the second hash 46B with the first hash 46A to verify the digital document 44.

Figure 3:
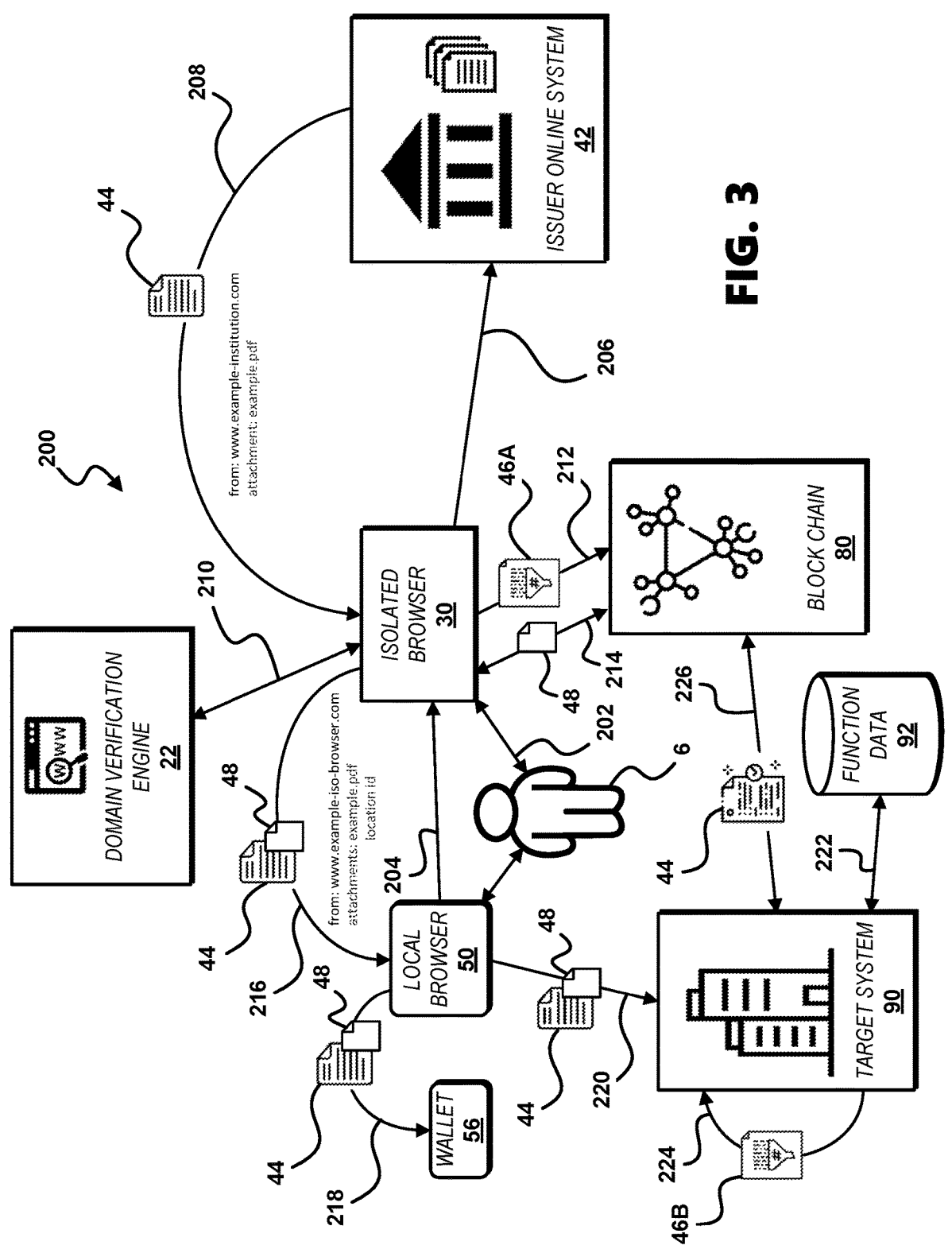

Referring to FIG. 3, a second process flow 200 enabled by the components set forth in the environment 10 is shown. In a step 202, a user 6, for example via a computing device 12, registers an account with an isolated browser 30 which provides a secure environment for online browsing activities and allows screening of potentially malicious data. The isolated browser 30 includes an application program interface ("API") for enabling the registration, or alternatively enables registration via an API (e.g., the browser API 32) enabled by the verification manager 20.

In a step 204, the user 6 via the local browser 50 initiates a connection to the isolated browser 30 via the local browser 50. The user 6 requests a digital document 44 (e.g., a digital diploma, "example.pdf") from an online interface of an issuer online system 42 (e.g., at "www.example-institution.com") via the isolated browser 30 (step 206), which digital document 44 is downloaded to the isolated browser 30 (step 208) and stored by the verification manager 20 in the document datastore 26. The isolated browser 30 detects the digital document 44 and verifies via the domain verification engine 22 an ownership of the internet domain (e.g., "www.example-institution.com") from which the digital document 44 was downloaded (step 210). In response to verifying the ownership of the domain, the isolated browser 30 applies a cryptographic function to the digital document 44 to generate a first hash 46A which is added to the blockchain 80 (step 212). The isolated browser 30 generates a location indicator 48 including an address for locating the blockchain 80 on the network 8 and locating the first hash 46A on the blockchain 80 (step 214). The location indicator 48 further includes a network link to access the cryptographic function used to generate the first hash 46A.

Further in response to verifying the ownership of the domain, the isolated browser 30 transmits the digital document 44 together with the location indicator 48 to the user 6 who receives it on their computing device 12 via the local browser 50 (step 216). The user 6 is enabled to add the digital document 44 and the location indicator 48 to their digital wallet 56 (step 218). Alternatively, the digital document 44 and the location indicator 48 are automatically added to the digital wallet 56 via the wallet API 34 of the verification manager 20.

In a subsequent transaction, the user 6 transmits the digital document 44 and the location indicator 48 via the local browser 50 to a target system 90 associated with a target entity that requested the digital document 44 from the user (step 220). Alternatively, the user 6 transmits the digital document 44 and the location indicator 48 via the email client 72 to the target system 90 associated with the target entity. Alternatively, the transmission of the digital document 44 and the location indicator 48 are performed by the digital wallet 56 in communication with a digital wallet or other credential repository rendered accessible by the target system 90.

The target system 90 accesses the cryptographic function at the network-accessible function datastore 92 via the network link included in the location indicator 48 (step 222). The target system 90 applies the cryptographic function to the digital document 44 to generate a second hash 46B (step 224). The target system 90 accesses the first hash 46A on the blockchain 80 based on the location indicator 48 including the address for locating the first hash 46A, and the target system 90 compares the second hash 46B to the first hash 46A to verify the digital document 44 (step 226). Alternatively, the blockchain 80 is configured with a verification engine which receives the digital document 44 and location indicator 48 from the target system 90 and applies the cryptographic function to the digital document 44 to generate another hash which is compared to the first hash 46A to verify the digital document 44. Alternatively, the blockchain 80 is configured with a verification engine which receives the second hash 46B and location indicator 48 from the target system 90 and compares the second hash 46B with the first hash 46A to verify the digital document 44.

Figure 4:
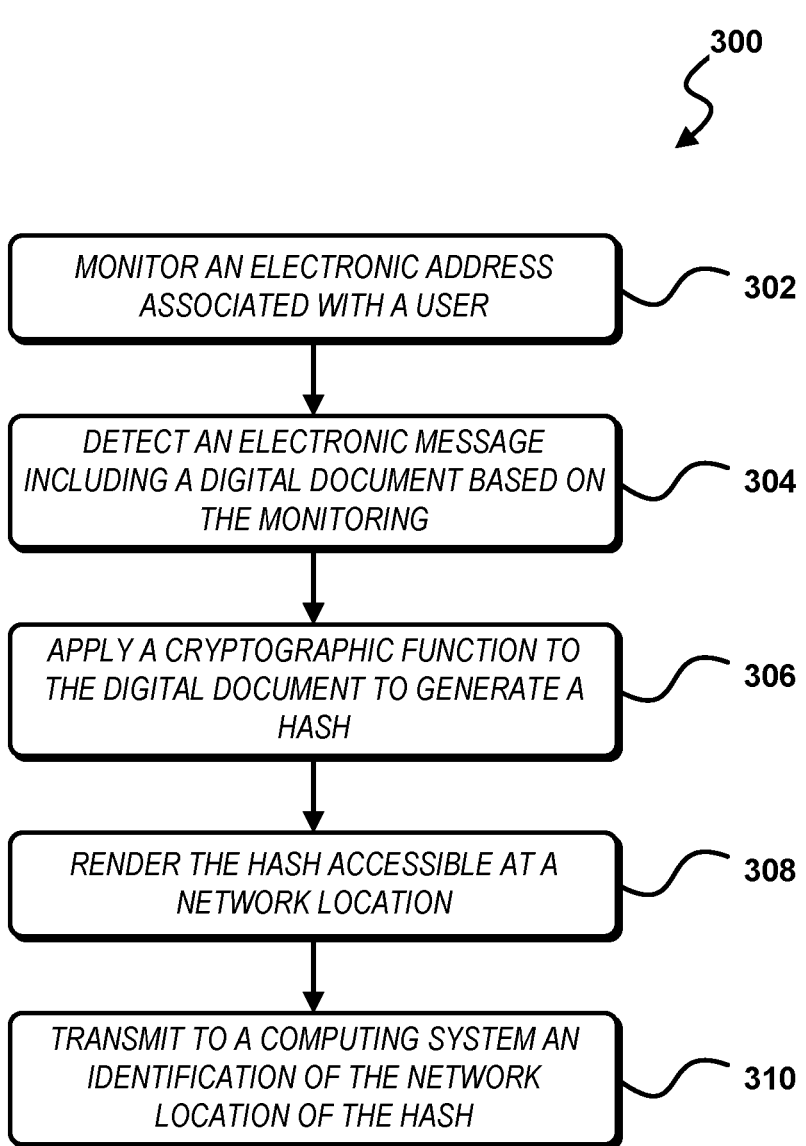
FIGS. 4 and 5 are diagrams showing methods in which a cryptographic function is applied to a digital document according to illustrative embodiments.

Referring to FIG. 4, a method 300 in which a cryptographic function is applied to a digital document is shown. The method 300 is described with reference to the components of the environment 10, including the verification manager 20, the issuer email systems 40, the issuer online systems 42, the email servers 58, the target systems 90, and the computing devices 12 including the local browser 50 and the monitoring agent 60. Alternatively, the method 300 can be performed via other systems and is not restricted to being implemented by the components of the environment 10.

The method 300 includes monitoring by one or more processors (e.g., by the verification manager 20) a first electronic address associated with a user (step 302). The method 300 further includes detecting, based on the monitoring, an electronic message including a first digital document (step 304). A cryptographic function is applied (e.g., by the email proxy 36) to the first digital document to generate a first hash, for example a checksum (step 306). The first hash is rendered accessible at a network location (step 308), and an identification of the network location of the first hash is transmitted (e.g., by the email proxy 36) to a first computing system (e.g., the computing device 12) associated with the user (step 310). The first hash can be added to a blockchain (e.g., the blockchain 80), wherein the identification of the network location of the first hash includes an indication of a location of the first hash on the blockchain.

The method 300 can also include receiving a request to activate the first electronic address, activating the first electronic address responsive to the request, receiving via the first electronic address from a second computing system (e.g., an issuer email system 40) the electronic message including the first digital document, and transmitting the electronic message including the first digital document to a second electronic address associated with the user. The method 300 can further include detecting one or more of characters, phrases, or field labels in the first digital document at one or more locations in the first digital document, and selectively obfuscating the first digital document based on the one or more locations in the first digital document to generate an obfuscated version of the first digital document, wherein the applying the cryptographic function to the first digital document to generate the first hash includes applying the cryptographic function to the obfuscated version of the first digital document to generate the first hash, and the transmitting the electronic message includes transmitting the obfuscated version of the first digital document. The second computing system can communicate via an internet domain, and the method 300 can further include verifying (e.g., by the domain verification engine 22) an ownership of the internet domain and transmitting (e.g., by the email proxy 36) the electronic message including the first digital document to the second electronic address responsive to verifying the ownership of the internet domain.

The method 300 can also include receiving (e.g., by the email proxy 36) via the first electronic address from a second computing system (e.g., an issuer email system 40) the electronic message including the first digital document, receiving (e.g., by the verification manager 20) from a third computing system (e.g., a target system 90) a verification request including a second digital document and the identification of the network location of the first hash, performing a verification to verify that the second digital document is identical to the first digital document at least based on the second digital document and the first hash, and transmitting (e.g., by the verification manager 20) an indication of the verification to the third computing system. Performing the verification can include applying the cryptographic function to the second digital document to generate a second hash and comparing the first hash to the second hash.

In the method 300, transmitting the identification of the network location of the first hash can include adding the identification of the network location of the first hash to a digital wallet associated with the user on the first computing system. The method 300 can further include adding the first digital document to the digital wallet.

In the method 300, an identification of the cryptographic function can be transmitted (e.g., by the verification manager 20) to the first computing system (e.g., the computing device 12) associated with the user. The method 300 can further include receiving (e.g., by the email proxy 36) via the first electronic address from a second computing system (e.g., an issuer email system 40) the electronic message including the first digital document, receiving from a third computing system (e.g., a target system 90) a verification request including a second hash and the identification of the network location of the first hash, comparing the first hash to the second hash to perform a verification to verify that the first hash is identical to the second hash, and transmitting (e.g., by the verification manager 20) an indication of the verification to the third computing system. Alternatively, the method 300 includes receiving from a third computing system (e.g., a target system 90) a request for the first hash including the identification of the network location of the first hash and transmitting the first hash to the third computing system responsive to the request allowing the third computing system to compare the first hash to the second hash to perform a verification to verify that the first hash is identical to the second hash.

Figure 5:
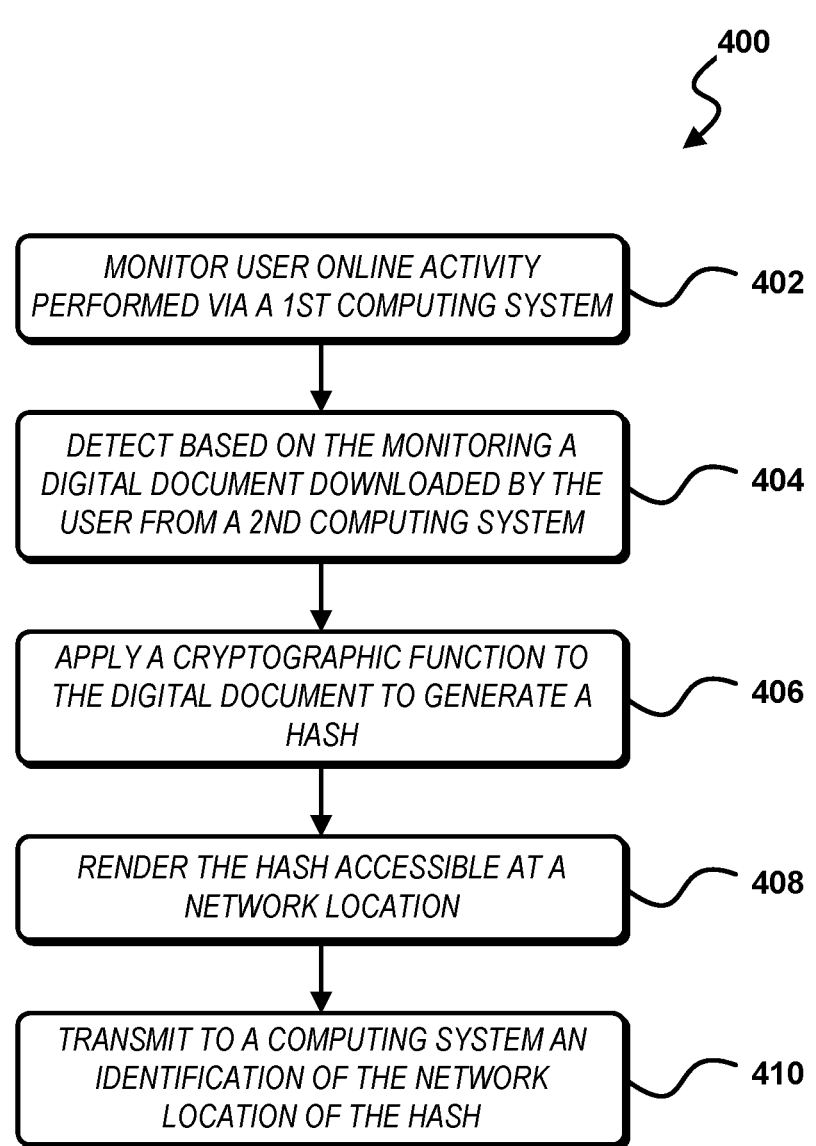

Referring to FIG. 5, a method 400 in which a cryptographic function is applied to a digital document is shown. The method 400 is described with reference to the components of the environment 10, including the verification manager 20, the issuer email systems 40, the issuer online systems 42, the email servers 58, the target systems 90, and the computing devices 12 including the local browser 50 and the monitoring agent 60. Alternatively, the method 400 can be performed via other systems and is not restricted to being implemented by the components of the environment 10.

The method 400 includes monitoring by one or more processors (e.g., by the verification manager 20) online activity of a user, the user performing the online activity via a first computing system (e.g., the computing device 12) (step 402). The monitoring of the online activity can be performed for example via one or more of an application, a browser extension, or a browser embedded software module executed by the first computing system. The method 400 further includes detecting, based on the monitoring by the one or more processors of the online activity, a first digital document downloaded by the user from a second computing system (e.g., an issuer online system 42) (step 404). A cryptographic function is applied (e.g., by the isolated browser 30) to the first digital document to generate a first hash (step 406). The first hash is rendered accessible at a network location (step 408), and an identification of the network location of the first hash is transmitted to the first computing system (step 410). The first hash can be added to a blockchain (e.g., the blockchain 80), wherein the identification of the network location of the first hash includes an indication of a location of the first hash on the blockchain.

The method 400 can also include enabling a network-based browser application (e.g., the isolated browser 30), enabling access by the user via the first computing system to the network-based browser application via a network, and monitoring the online activity of the user via the network-based browser application.

The method 400 can also include detecting one or more of characters, phrases, or field labels in the first digital document at one or more locations in the first digital document, and selectively obfuscating the first digital document based on the one or more locations in the first digital document to generate an obfuscated version of the first digital document, wherein the applying the cryptographic function to the first digital document to generate the first hash includes applying the cryptographic function to the obfuscated version of the first digital document to generate the first hash.

The method 400 can also include receiving (e.g., by the verification manager 20) from a third computing system (e.g., a target system 90) a verification request including a second digital document and the identification of the network location of the first hash, performing (e.g., by the verification manager 20) a verification that the second digital document is identical to the first digital document at least based on the second digital document and the first hash, and transmitting an indication of the verification to the third computing system.

The method 400 can also include transmitting (e.g., by the verification manager 20), to the first computing system associated with the user, an identification of the cryptographic function. The method 400 can further include receiving from a third computing system (e.g., a target system 90) a verification request including a second hash and the identification of the network location of the first hash, comparing (e.g., by the verification manager 20) the first hash to the second hash to perform a verification to verify that the first hash is identical to the second hash, and transmitting an indication of the verification to the third computing system. Alternatively, the method 400 includes receiving from a third computing system (e.g., a target system 90) a request for the first hash including the identification of the network location of the first hash and transmitting the first hash to the third computing system responsive to the request allowing the third computing system to compare the first hash to the second hash to perform a verification to verify that the first hash is identical to the second hash.

Figure 6:
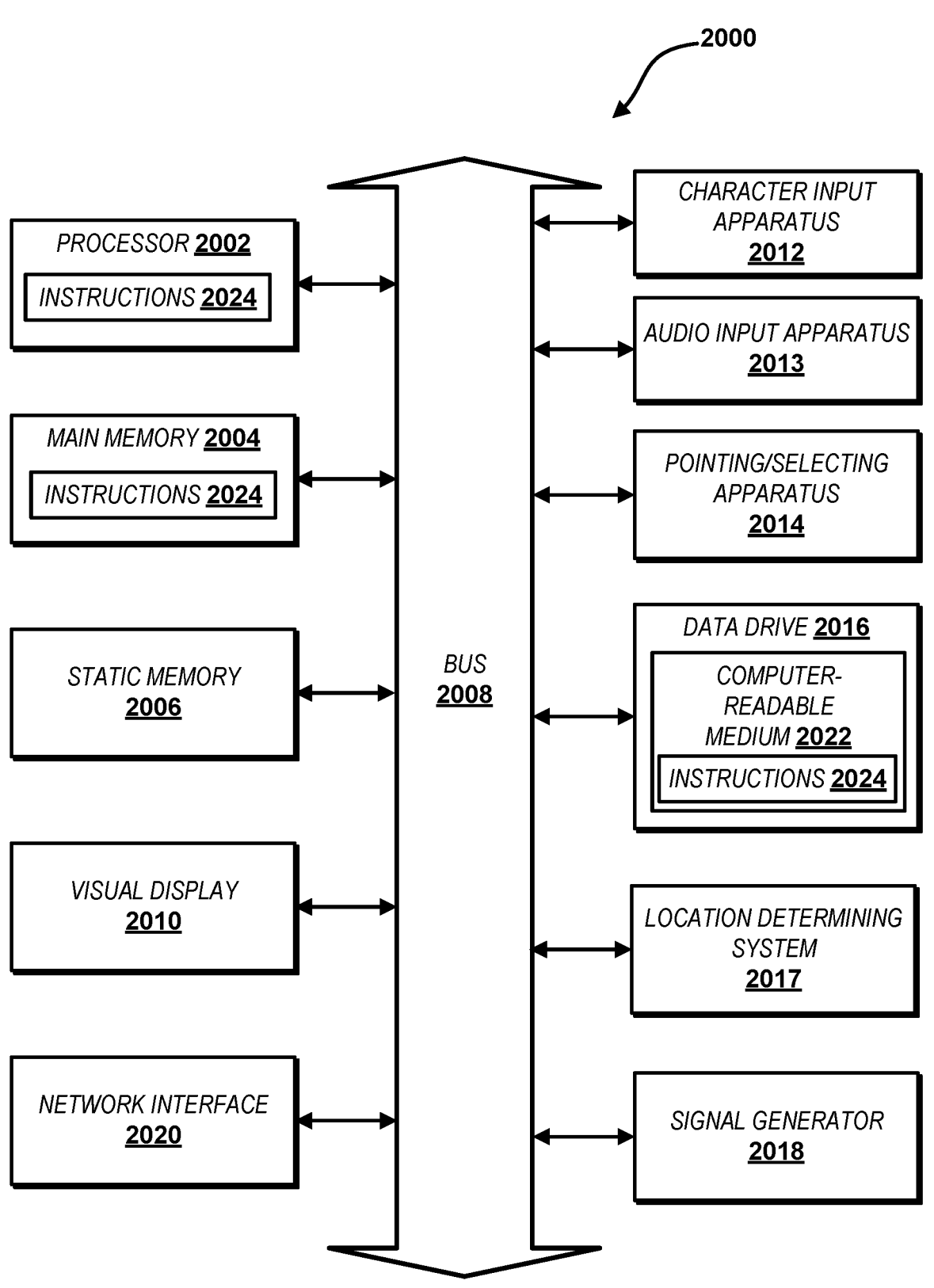
FIG. 6 shows a computer system for performing described methods according to illustrative embodiments.

FIG. 6 illustrates in abstract the function of an exemplary computer system 2000 on which the systems, methods and processes described herein can execute. For example, the computing device 12, verification manager 20, issuer email systems 40, issuer online systems 42, email servers 58, and target systems 90 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), a light emitting diode (LED) display, or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method, performed by one or more processors, comprising:

monitoring by the one or more processors online activity of a user via a local browser in a first computing system;

detecting, by the one or more processors and based on the monitoring, a first digital document downloaded by the user via the local browser in the first computing system from a second computing system;

applying, by a network-based browser in a third computing system, a cryptographic function to the first digital document to generate a first hash, wherein the first hash is generated by applying the cryptographic function to an obfuscated version of the first digital document;

rendering accessible, by the one or more processors, the first hash at a network location; and transmitting, by the one or more processors, an identification of the network location of the first hash to the first computing system.

2. The method of claim 1, further comprising monitoring via the local browser the online activity via at least one of an application, a browser extension, or a browser embedded software module executed by the first computing system.

3. The method of claim 1, further comprising:

enabling the network-based browser;

enabling access by the user via the first computing system to the network-based browser via a network;

monitoring the online activity of the user via the network-based browser; and detecting, by the one or more processors and based on the monitoring, the first digital document downloaded by the user via the network-based browser from the second computing system.

4. The method of claim 1, further comprising:

detecting at least one of characters, phrases, or field labels in the first digital document at at least one location in the first digital document; and selectively obfuscating the first digital document based on the at least one location in the first digital document to generate the obfuscated version of the first digital document.

5. The method of claim 1, further comprising:

receiving from a fourth computing system a verification request comprising a second digital document and the identification of the network location of the first hash;

performing a verification that the second digital document is identical to the first digital document at least based on the second digital document and the first hash; and transmitting an indication of the verification to the fourth computing system.

6. The method of claim 1, further comprising transmitting, to the first computing system, an identification of the cryptographic function.

7. The method of claim 6, further comprising:

receiving from a fourth computing system a verification request comprising a second hash and the identification of the network location of the first hash;

comparing the first hash to the second hash to perform a verification to verify that the first hash is identical to the second hash; and transmitting an indication of the verification to the fourth computing system.

8. The method of claim 1, further comprising:

receiving from a fourth computing system a request for the first hash comprising the identification of the network location of the first hash; and transmitting the first hash to the fourth computing system responsive to the request.

9. The method of claim 8, further comprising transmitting, to the first computing system, an identification of the cryptographic function.

10. A system, comprising:

one or more processors; and memory storing executable instructions that, as a result of being executed, cause the system to perform operations comprising:

monitoring by the one or more processors online activity of a user via a local browser in a first computing system;

detecting, by the one or more processors and based on the monitoring, a first digital document downloaded by the user via the local browser in the first computing system from a second computing system;

applying, by a network-based browser in a third computing system, a cryptographic function to the first digital document to generate a first hash, wherein the first hash is generated by applying the cryptographic function to an obfuscated version of the first digital document;

rendering accessible, by the one or more processors, the first hash at a network location; and transmitting, by the one or more processors, an identification of the network location of the first hash to the first computing system.

11. The system of claim 10, the operations further comprising:

receiving from a fourth computing system a verification request comprising a second digital document and the identification of the network location of the first hash;

performing a verification that the second digital document is identical to the first digital document at least based on the second digital document and the first hash; and transmitting an indication of the verification to the fourth computing system.

12. The system of claim 10, the operations further comprising:

transmitting, to the first computing system associated with the user, an identification of the cryptographic function;

receiving from a fourth computing system a verification request comprising a second hash and the identification of the network location of the first hash;

comparing the first hash to the second hash to perform a verification to verify that the first hash is identical to the second hash; and transmitting an indication of the verification to the fourth computing system.

13. The system of claim 10, wherein the network-based browser comprises an isolated network-based browser, the operations further comprising:

enabling the isolated network-based browser;

enabling access by the user via the first computing system via the local browser executed by the first computing system to the isolated network-based browser via a network;

monitoring the online activity of the user via the isolated network-based browser; and detecting, by the one or more processors and based on the monitoring of the online activity of the user via the isolated network-based browser, the first digital document downloaded by the user via the local browser via the isolated network-based browser from the second computing system.

14. A non-transitory computer-readable storage medium storing executable instructions that, as a result of execution by one or more processors of a computer system, cause the computer system to perform operations comprising:

monitoring by the one or more processors online activity of a user via a local browser in a first computing system;

detecting, by the one or more processors and based on the monitoring, a first digital document downloaded by the user via the local browser in the first computing system from a second computing system;

applying, by a network-based browser in a third computing system, a cryptographic function to the first digital document to generate a first hash, wherein the first hash is generated by applying the cryptographic function to an obfuscated version of the first digital document;

rendering accessible, by the one or more processors, the first hash at a network location; and transmitting, by the one or more processors, an identification of the network location of the first hash to the first computing system.

\* \* \* \* \*